UNITED STATES PATENT OFFICE.

LUDWIG GROTE, OF DRESDEN, GERMANY.

COMPOSITION FOR TREATING ARTICLES MADE FROM PAPER.

SPECIFICATION forming part of Letters Patent No. 445,111, dated January 20, 1891.

Application filed April 23, 1890. Serial No. 349,167. (No specimens.)

*To all whom it may concern:*

Be it known that I, LUDWIG GROTE, a subject of the Emperor of Germany, residing at Dresden, Saxony, in the German Empire, have invented a new and useful Composition for Treating Articles Made from Paper or the Like, of which the following is a specification.

The object of this invention is an improved composition for the treatment of handles, tool-shafts, and similar articles made of paper or paper-pulp. For this purpose a paste is first prepared by mixing starch, water-glass, and some fatty substance somewhat in the following proportions: One part of starch is first dissolved in five parts of water, and to this solution is added an equal amount, by weight, of water-glass at from 30° to 35°, whereupon the mass thus obtained is stirred so as to thoroughly mix together the ingredients, and finally from five to twenty parts of a suitable fatty substance are added, for which purpose I preferably employ beeswax. This paste is then added to the paper, which may be accomplished by two different methods: First, ordinary paper-pulp may be employed, such as is used for the manufacture of paper or cardboard, it being immaterial whether it is made of rags, cellulose, straw, or any other suitable substance, this paper-pulp being mixed with the paste above referred to, and then molded in suitable molds or dies into the desired shape; or, second, ready-made paper may be utilized by being cut into long strips, which are then drawn through the paste above referred to, and thus impregnated therewith. After this they are wound round a cylindrical or conical core or mandrel and compressed thereon by means of one or more rollers, and the tubes thus obtained are finally turned to the desired shape on an ordinary lathe.

The articles obtained by either the first or second of the methods just described are dipped into a solution of, say, twenty-five parts of sugar, ten parts of slaked lime, and sixty-five parts of water, and then allowed to dry. This solution prevents salt precipitates forming on the surface of the article, owing to the use of water-glass. The articles obtained by this process are remarkable for their density, and are practically indestructible, while at the same time they are very yielding. In tool handles or shafts manufactured in this manner it is not necessary, for example, to bore or burn an opening fitting exactly the size of the tool, it being easy to force the core of a tool measuring twenty-five millimeters in diameter into an opening of five millimeters diameter, which will readily spread out to fit the tool without any risk of its breaking.

I claim—

1. A composition for the purpose set forth, comprising starch, water-glass, and a fatty substance, substantially as described.

2. The composition for the purpose set forth, comprising a starchy substance, water-glass, and beeswax, substantially as described.

In witness thereof I affix hereunto my signature in presence of two witnesses.

LUDWIG GROTE.

Witnesses:
 RUD. SCHMIDT,
 PAUL DRUCKMÜLLER.